(12) United States Patent
Emsbo (10) Patent No.: US 6,412,221 B1
(45) Date of Patent: Jul. 2, 2002

(54) CATALYST DOOR SYSTEM

(75) Inventor: Jon Emsbo, Upper Saddle River, NJ (US)

(73) Assignee: Thermal Engineering International, Lyman, SC (US)

( * ) Notice: Subject to any disclaimer, the term of this patent is extended or adjusted under 35 U.S.C. 154(b) by 0 days.

(21) Appl. No.: 09/630,975

(22) Filed: Aug. 2, 2000

Related U.S. Application Data
(60) Provisional application No. 60/146,353, filed on Aug. 2, 1999.

(51) Int. Cl.[7] .................................................. E05F 11/52
(52) U.S. Cl. ..................................... 49/154; 292/256.75
(58) Field of Search ........................... 49/154, 155, 156, 49/254, 255, 256; 411/400, 401; 292/256.75, 54, 44

(56) References Cited

U.S. PATENT DOCUMENTS

| | | | |
|---|---|---|---|
| 66,778 A | * | 1/1867 | Beardsley |
| 342,299 A | * | 5/1886 | Hunter ........................ 49/154 |
| 572,475 A | * | 12/1896 | Davison ....................... 49/154 |
| 608,330 A | * | 8/1898 | Hicks ........................... 49/154 |
| 1,008,385 A | * | 11/1911 | Spencer, Jr. |
| 1,276,207 A | * | 8/1918 | Fusselman .................... 49/154 |
| 1,480,544 A | * | 1/1924 | Cox |
| 2,752,187 A | * | 6/1956 | Gordon |
| 3,756,640 A | * | 9/1973 | Johnson ................. 292/256.75 |
| 3,786,955 A | * | 1/1974 | Mowatt-Larssen ........ 220/55 E |
| 4,304,415 A | * | 12/1981 | Wolf et al. .................. 277/205 |
| 4,574,973 A |   | 3/1986 | Lewis, Jr. et al. .......... 220/259 |
| 4,685,586 A |   | 8/1987 | Lewis, Jr. et al. .......... 220/305 |
| 5,158,043 A |   | 10/1992 | Emsbo ........................ 122/498 |

* cited by examiner

*Primary Examiner*—Curtis Cohen
(74) *Attorney, Agent, or Firm*—Leatherwood Walker Todd & Mann, P.C.

(57) ABSTRACT

A high temperature industrial door having a flexible door plate with notches about the periphery thereof for receipt of swing bolts. The door plate includes interior insulation and is suspended from and hinged to a door frame using a davit assembly. In the closed position, the lower edge of the door extends below floor level. To open the door, the davit assembly allows the door to be lifted above floor level and moved to an open position, by pivoting of the davit assembly.

15 Claims, 11 Drawing Sheets

CATALYST DOOR SYSTEM

This Application claims benefit of U.S. Provisional Application No. 60/146,353, filed Aug. 2, 1999, the entirety of such provisional application being incorporated herein by reference thereto.

BACKGROUND OF THE INVENTION

This invention relates generally to an insulated, gas tight door for use in high temperature industrial applications, such as on boilers, economizers, scrubbers, precipitators, bag houses, flue gas ducts, etc., and in particular, to door systems for selective catalytic reactor (SCR) systems. SCR systems use catalyst material held in containers to reduce nitrogen oxides from flue gas, such containers being periodically transported into and out of the SCR structure to replenish the catalyst as necessary.

Access doors for industrial applications have been patented and, for example, are disclosed in U.S. Pat. Nos. 4,574,973; 4,685,586; and 5,158,043. Such doors were initially developed to eliminate door leakage and cold spots, which could cause inside acid condensation and resulting corrosion, and to provide fast and adequate access for internal maintenance of such equipment. Other types of doors have since been developed to provide other features in different applications for flue gas.

However, a need exists for a door which provides a tight seal for a high temperature industrial application, such as for a SCR system, and which facilitates transport of equipment and supplies, such as containers of catalyst, into and out of such industrial application.

SUMMARY OF THE INVENTION

It is, therefore, the principal object of this invention to provide an industrial door system for high temperature applications.

Another object of the present invention is to provide a door system for a selective catalytic reactor (SCR) system.

A further object of the present invention is to provide a door system which can be readily installed on a casing wall and with a door opening having variances in the dimensions of such door opening.

A still further object of the present invention is to provide a door for an SCR system using a davit arrangement.

Yet another object of the present invention is to provide a door for a SCR system which allows for heavy catalyst containers to be transported into and out of a SCR structure.

Generally, the present invention includes an SCR catalyst door having a flat and somewhat flexible door plate with notches around the edge thereof for receipt of swing bolts which are attached to a door frame. The door plate may include interior insulation and is suspended from a davit assembly mounted on the casing wall of the SCR structure adjacent to the door.

A sealing gasket is provided around the perimeter of the door plate, such gasket being flexible to provide a tight seal of the door against the door frame, even upon the occurrence of some warpage of the SCR system casing wall and/or the door frame. Preferably, the sealing gasket is square in cross-section, and is comprised of braided ceramic material. Such gasket is seated between stainless steel retainers provided about the edges of the door plate. These gasket retainers are placed in a dove-tail pattern which accommodate the expansion of the gasket, once the gasket is compressed in a sealing relationship. By capturing such expanded portion of the gasket, the retainers reduce the likelihood that the gasket will work loose when the door is opened.

The lower edge of the door extends downwardly below the floor level of the SCR system floor, and the lower edge of the door opening is typically flush with the floors on the inside and outside of the SCR building.

The door is generally attached to exterior of the SCR casing, and because personnel, wheeled carts and other vehicles may be required to enter the opening of the SCR system periodically, a landing, or platform, typically extends outwardly from the exterior of the building adjacent the door. Such platform may include a well, or recess, along the lower edge of the door opening into which the lower edge of the door is received.

A problem arises, however, in that in order to swing the door open in a conventional manner, such as by using conventional hinges at the edge of the door, the door would only be able to move to the boundary of the recess and would thus be blocked from opening fully. Accordingly, the door of the present invention includes a davit assembly modified to allow the door to be easily lifted by a predetermined amount in order to rise upwardly and out of the recess, to therefore allow the door to swing over the platform to a fully open position.

Closing of the door is accomplished in the reverse manner by swinging the door over the recess, and then lowering it back into place with the davits such that the lower edge of the door extends into the recess, below floor height. The door is then resealed against the door frame.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

The accompanying drawings and the description which follows set forth this invention in its preferred embodiment. However, it is contemplated that persons generally familiar with door systems will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the door system of the present invention is indicated generally in the figures by reference character 10.

Figure 1A:
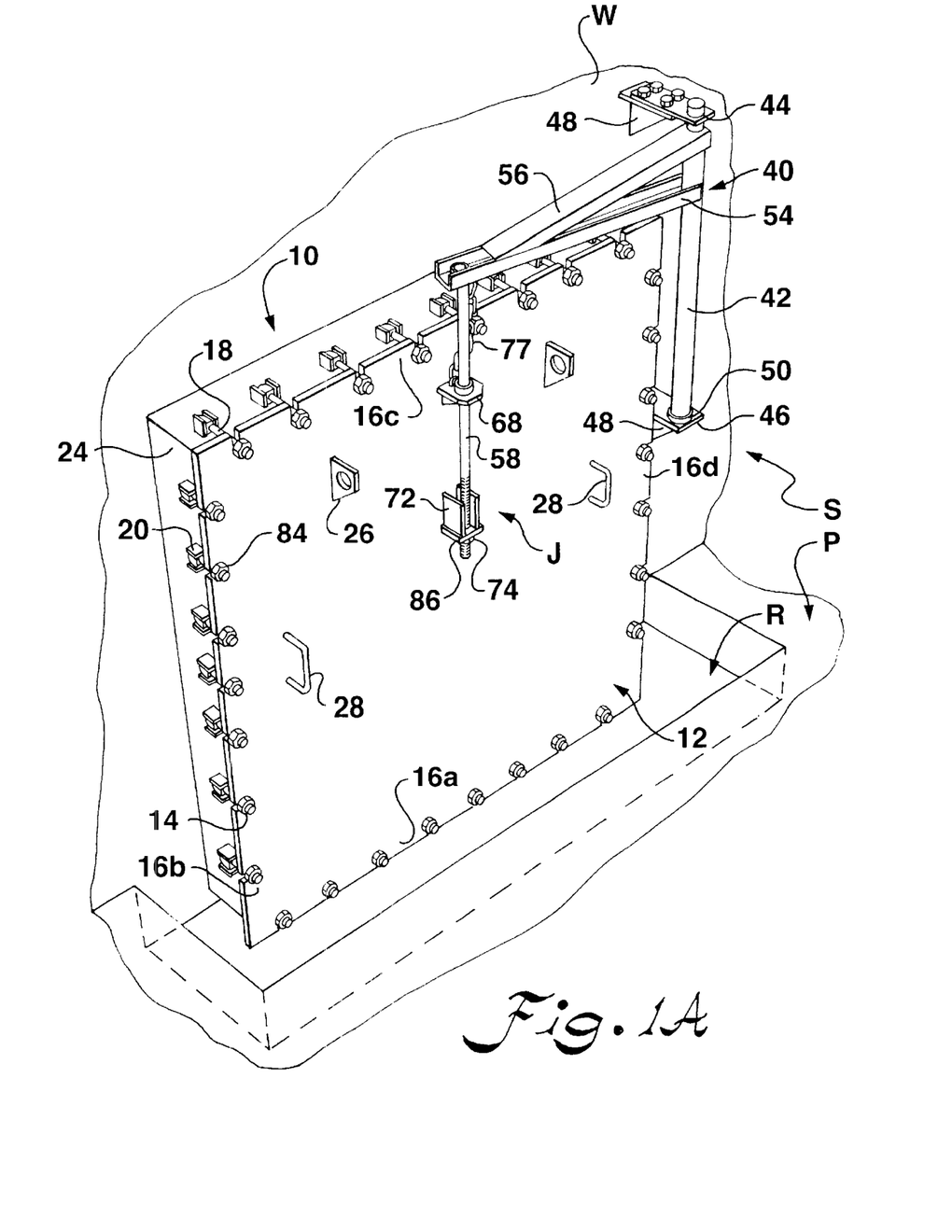
FIG. 1A is a perspective view of a door system constructed in accordance with the present invention, such door system being shown in a closed position.
Figure 1B:
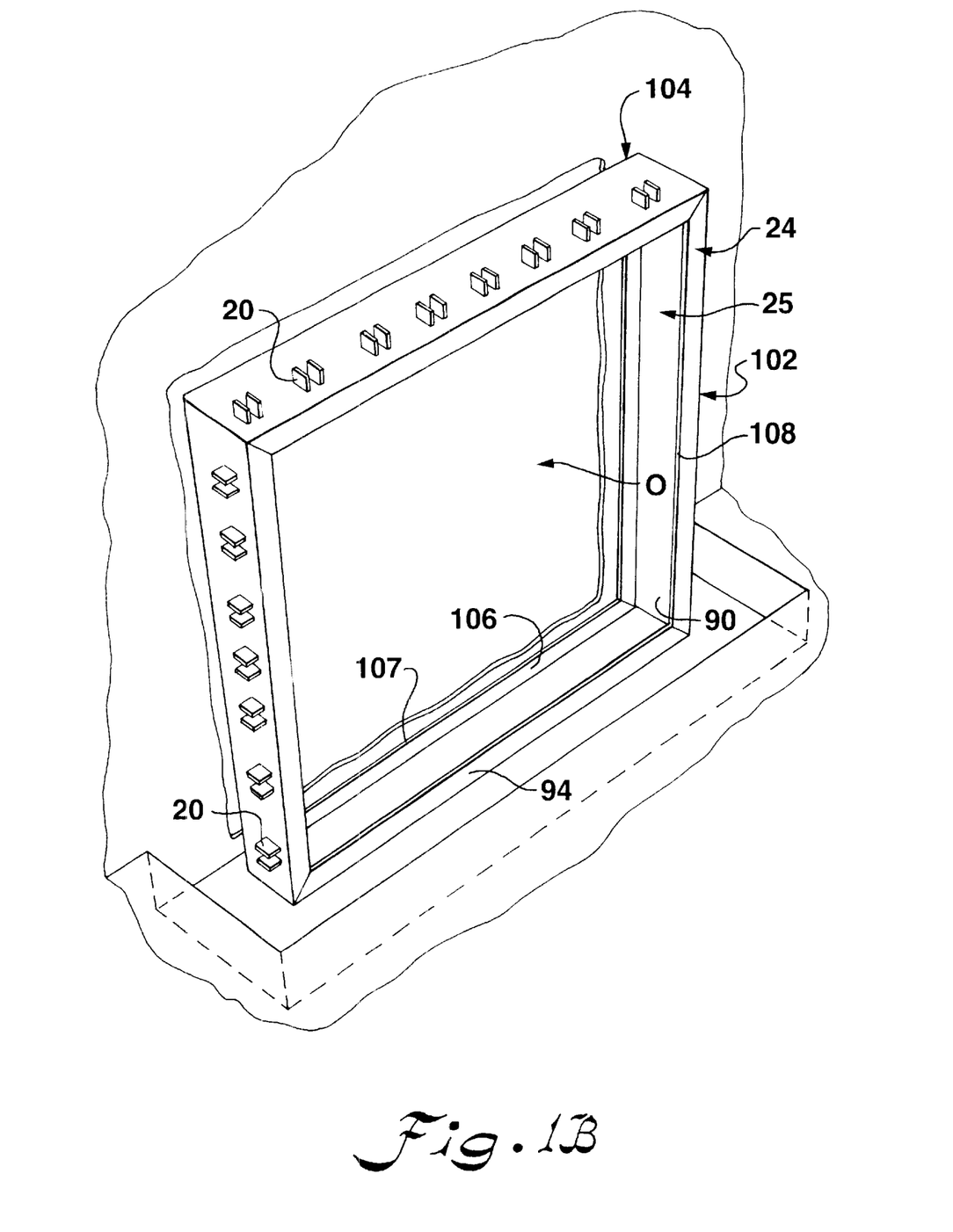
FIG. 1B is a perspective view of a door frame for a door system constructed in accordance with the present invention, the door frame being shown prior to installation.

In FIG. 1A of the drawings, door system 10 is illustrated installed on a casing wall W of an SCR system, typically in the form of a building or other structure, generally S, having a door, generally 12, with slots, or notches, 14 around the peripheral portions, or edges, 16a, 16b, 16c, an 16d thereof. Received in the notches 14 are fasteners, such as swing bolts, 18 pivotally carried between ears 20 on pins 22 (FIGS. 5A through 5C), ears 20 being attached to a door frame, generally 24. Door 12 is preferably constructed of steel, as is frame 24 (which defines doorway 25)(FIG. 1B), and includes lifting lugs 26, as well as handles 28, used during opening and closing of the door 12.

Figures 5A, 6:
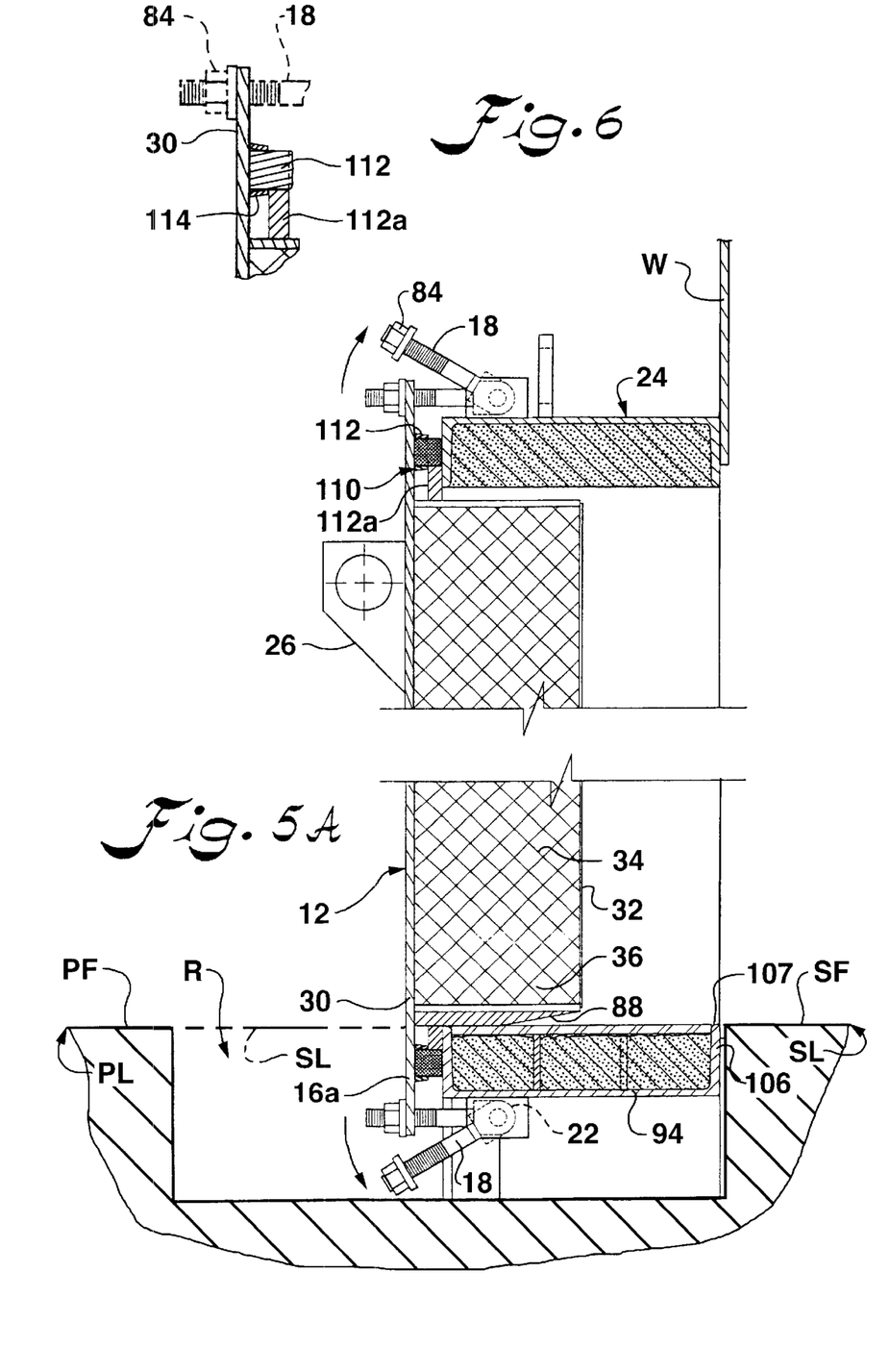
FIG. 5A is a sectional view taken along lines 5—5 of FIG. 2A, showing the door in a closed position.
FIG. 6 is a sectional view, with the parts cut away, of a gasket configuration constructed in accordance with the present invention.
Figure 5B:
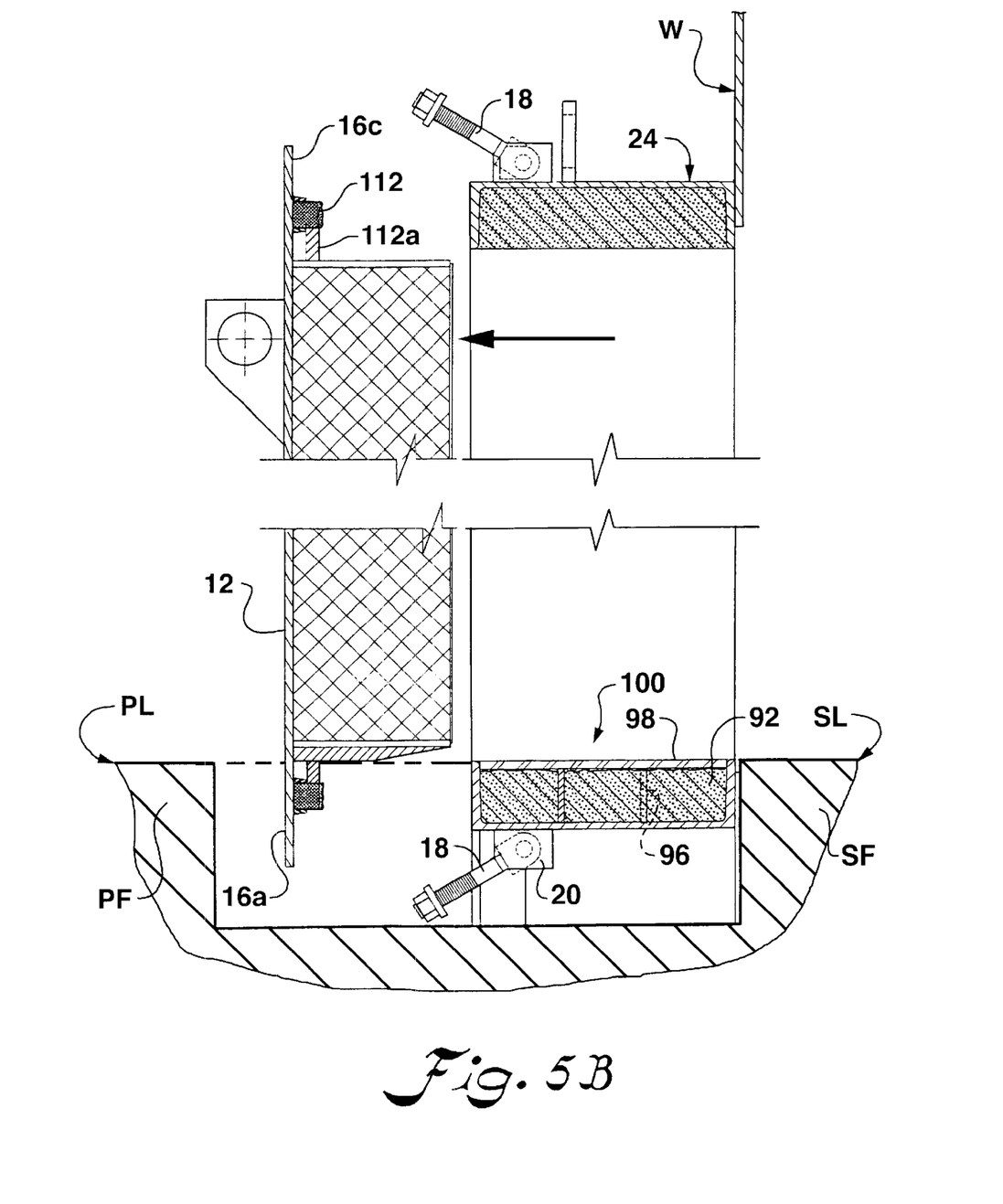
FIG. 5B is a sectional view taken along lines 5—5 of FIG. 2A, illustrating the door having been moved away from the door frame.
Figure 5C:
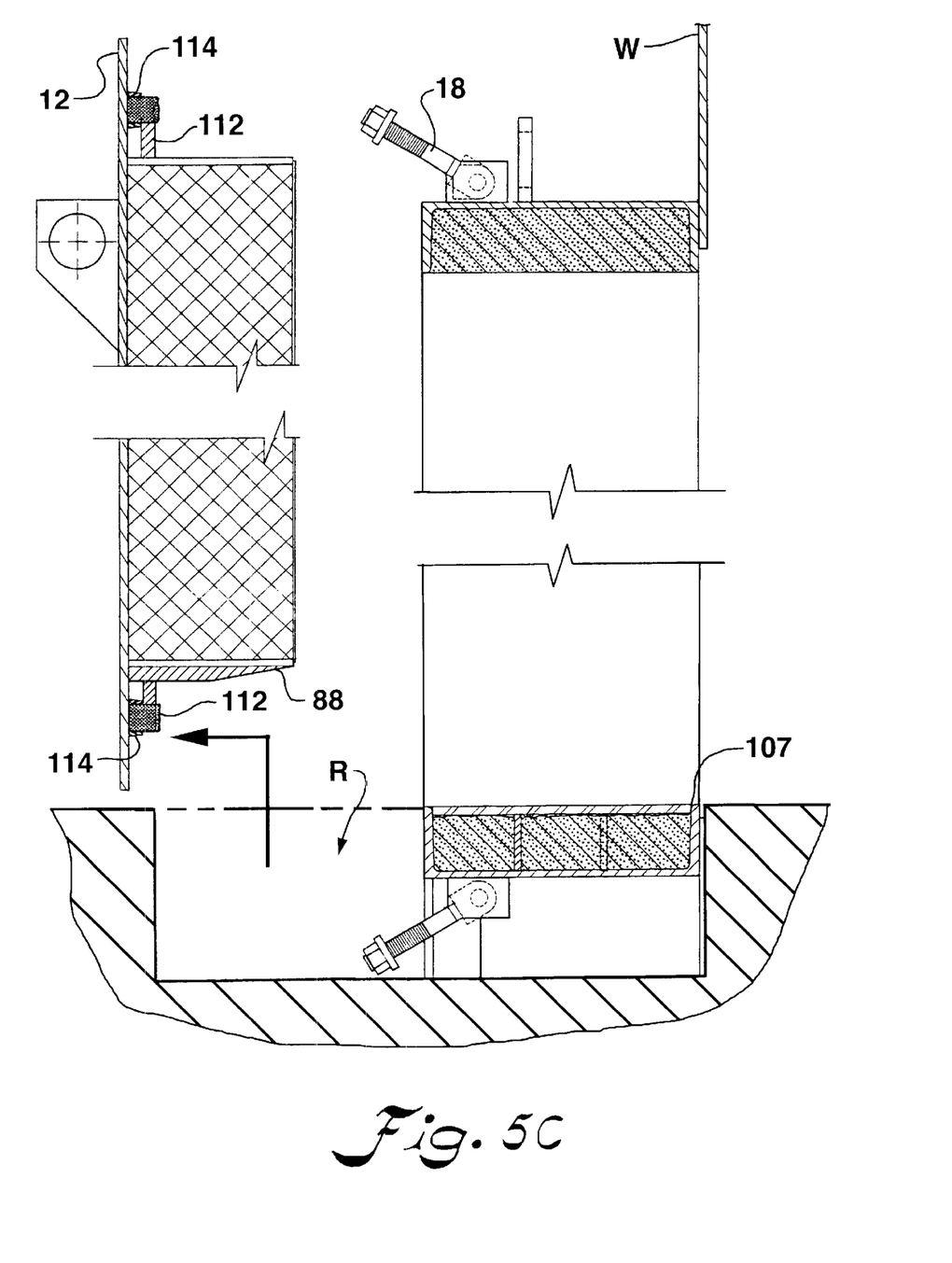
FIG. 5C is a sectional view taken along lines 5—5 of FIG. 2A, showing the door having been lifted out of a recess to a height above floor level.

As shown in FIGS. 5A through 5C, door 12 includes an outer door panel, or plate, 30, and an inner door panel, or plate, 32 defining a compartment 34 therebetween. Insulation material 36 is provided in compartment 34.

FIGS. 1A, 2A, 2B, 3, and 7, illustrate a davit assembly, generally 40, is provided which pivots with respect to the SCR structure S. The davit assembly 40 includes a davit post 42 carried for pivoting movement by upper and lower davit support brackets, 44, 46, respectively, such support brackets 44, 46, being attached to a structural member of the SCR structure by brackets, generally 48. A load bearing journal 50 and thrust washer 52 (FIG. 7) are provided for supporting davit post 42 for rotation with respect to lower bracket support 46. Although thrust washer 52 is preferably stainless steel, it could be constructed of other suitable materials. A pin 57 (FIG. 9) fixes post 42 with respect to upper bracket 44.

Figure 7:
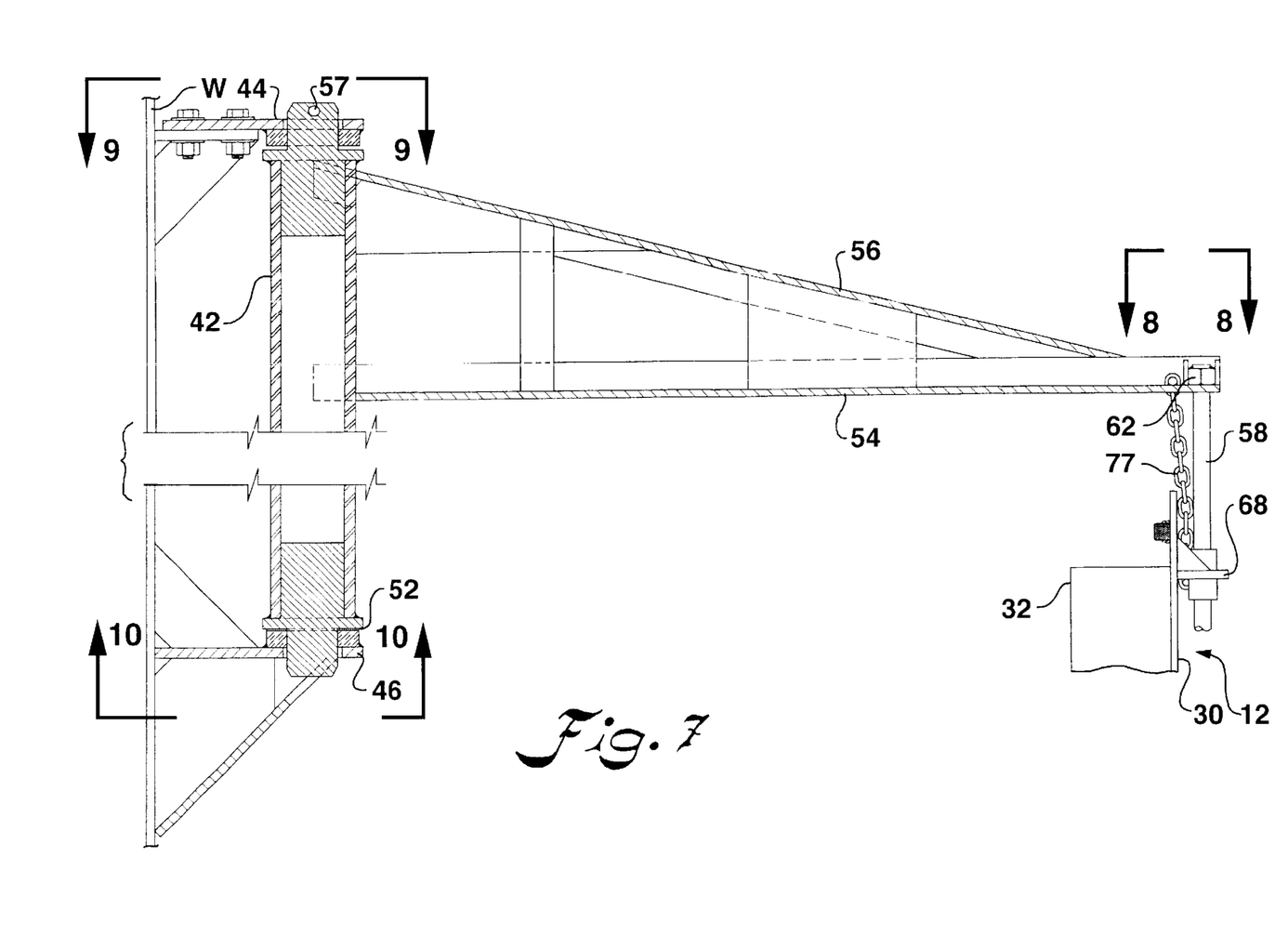
FIG. 7 is a sectional view of a davit assembly constructed in accordance with the present invention.
Figures 8, 9:
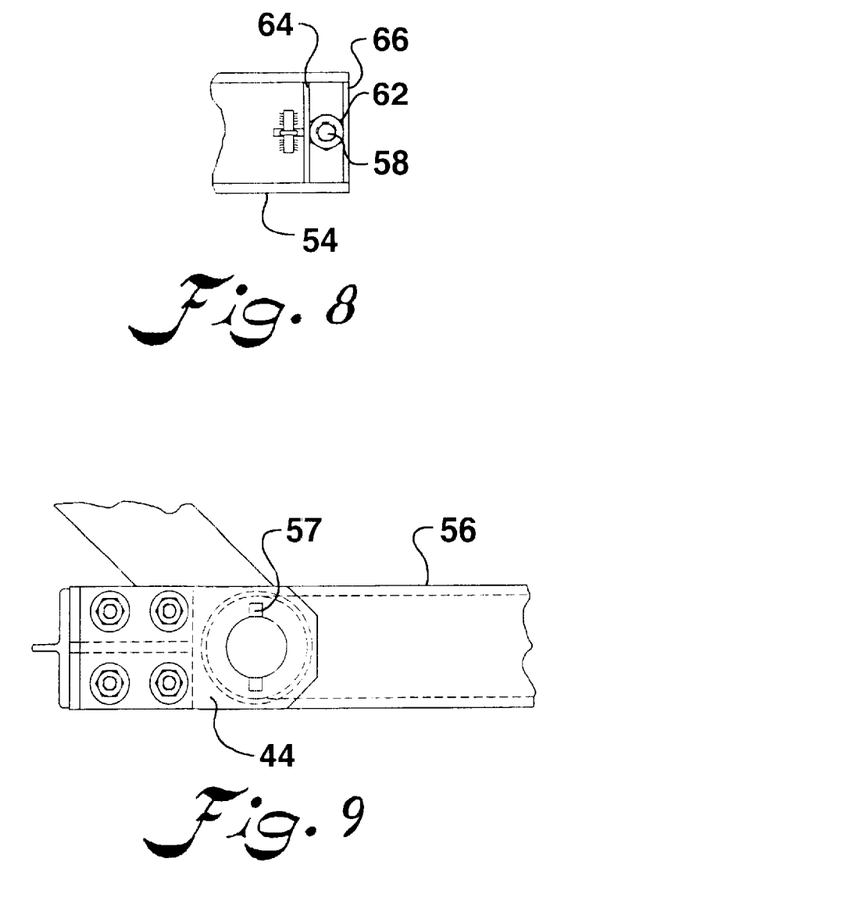
FIG. 8 is a sectional view taken along lines 8—8 of FIG. 7.
FIG. 9 is a sectional view taken along lines 9—9 of FIG. 7.
Figure 10:
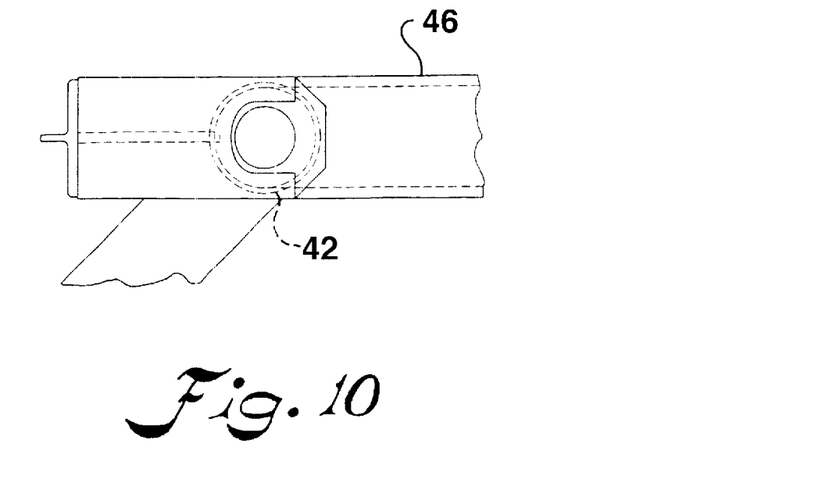
FIG. 10 is a sectional view taken along lines 10—10 of FIG. 7.

Davit assembly 40 includes a cantilever arm 54 attached to davit post 42 and also a support brace 56 connected between arm 54 and davit post 42. Davit assembly 40 includes a jack mechanism, generally J, which could be of various designs, but which preferably includes a screw-type jack having a suspension rod, generally 58, extending downwardly from arm 54. The upper end 60 of suspension rod 58 is connected to arm 54, as shown in FIGS. 7 and 8, via a nut 62 captured and restrained from movement between flanges, 64 and 66. Preferably, nut 62 is welded to suspension rod 58 in order to prevent any relative rotation of suspension rod 58 with respect to arm 54. A journal support bracket 68 is fixedly attached to outer door plate 34, through which suspension rod 58 extends. Suspension rod 58 includes a threaded portion 70, extending through a bracket, or yoke, 72, and a suspension rod nut 74 are threadingly carried on suspension rod 58. A washer 75 is interposed between nut 74 and yoke 72. Nut 74 is prevented from becoming detached from rod 58, preferably by welding the threads at the end of rod 58.

During opening and closing of the door 12, the weight of the door is borne by suspension rod nut 74, such weight being transmitted by suspension rod 58 to the davit assembly 40. Washer 75 and nut 74 are preferably bronze, although any other suitable material could be used. A safety chain 77, also known as a fall chain, is connected between bracket 68 and arm 54 for restraining door 12 in the event of failure of rod 58 and/or yoke 72.

Turning to FIG. 1A, door 12 is shown in a closed position for sealing the door opening O (FIG. 1B) of the SCR structure S. In the closed position, it can be seen that the lower edge 16a of the door 12 extends below door opening O, and also below the floor level SL (FIGS. 2A, 3, and 5A) of the SCR floor SF. The lower edge 16a of the door 12 is positioned within a well, or recess, generally R, in the platform, or landing, generally P, extending outwardly adjacent the SCR floor SF, such platform P having a floor PF typically being at generally the same floor level PL as is the floor level SL of the SCR floor SF.

Recess R, which extends at least the full width of door 12, is provided in platform P, and is defined in part by the SCR system exterior wall W.

Figure 2A:
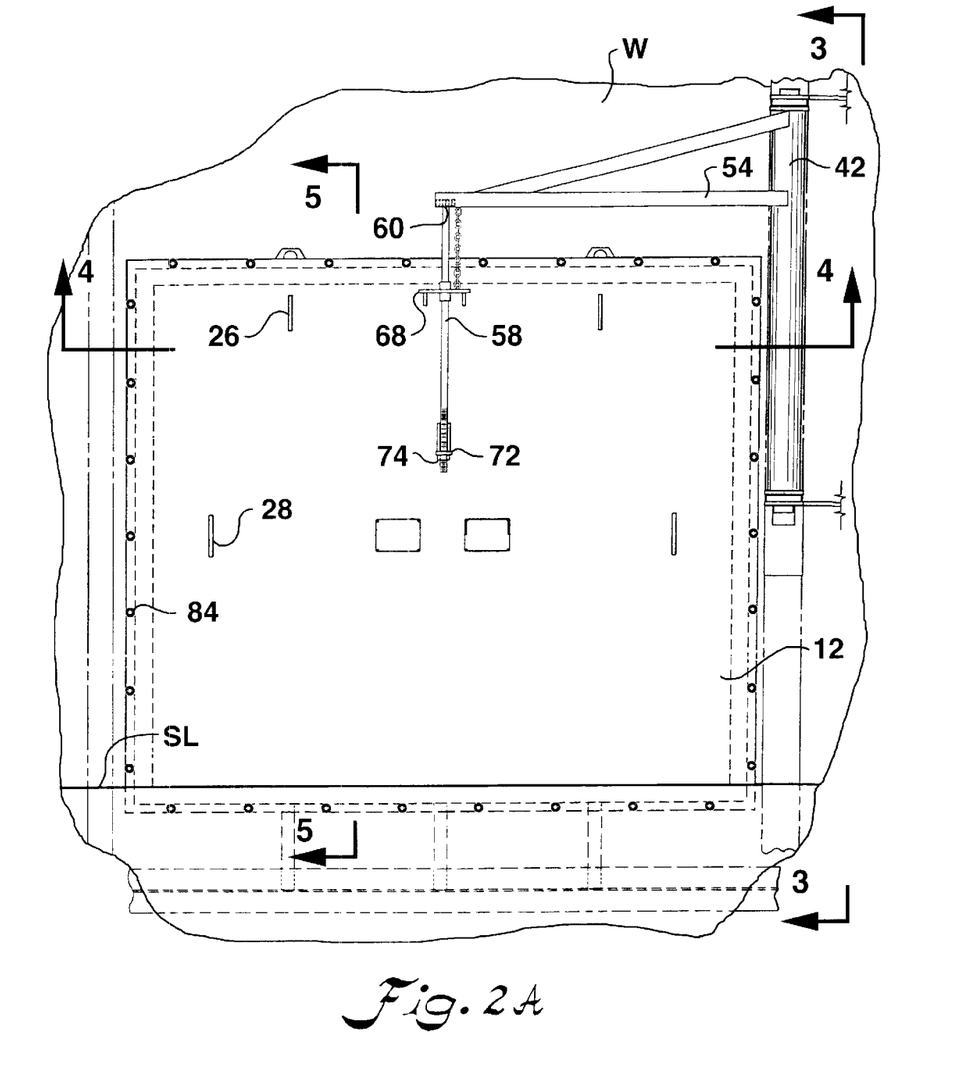
FIG. 2A is a front elevational view of a door system constructed in accordance with the present invention, with such door system being shown in a closed position.
Figure 2B:
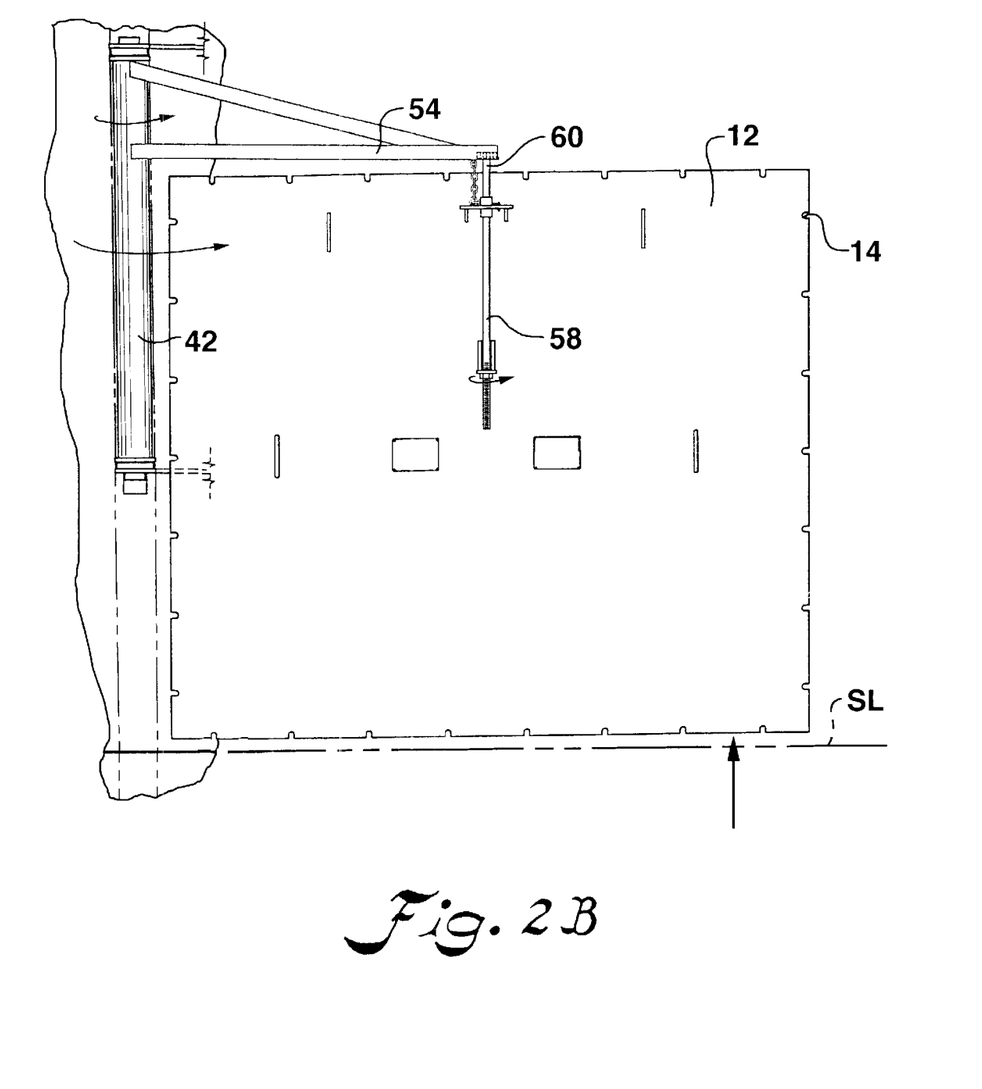
FIG. 2B is a front elevational view of the door system shown in FIG. 2A, with such door being shown in an open position.
Figure 3:
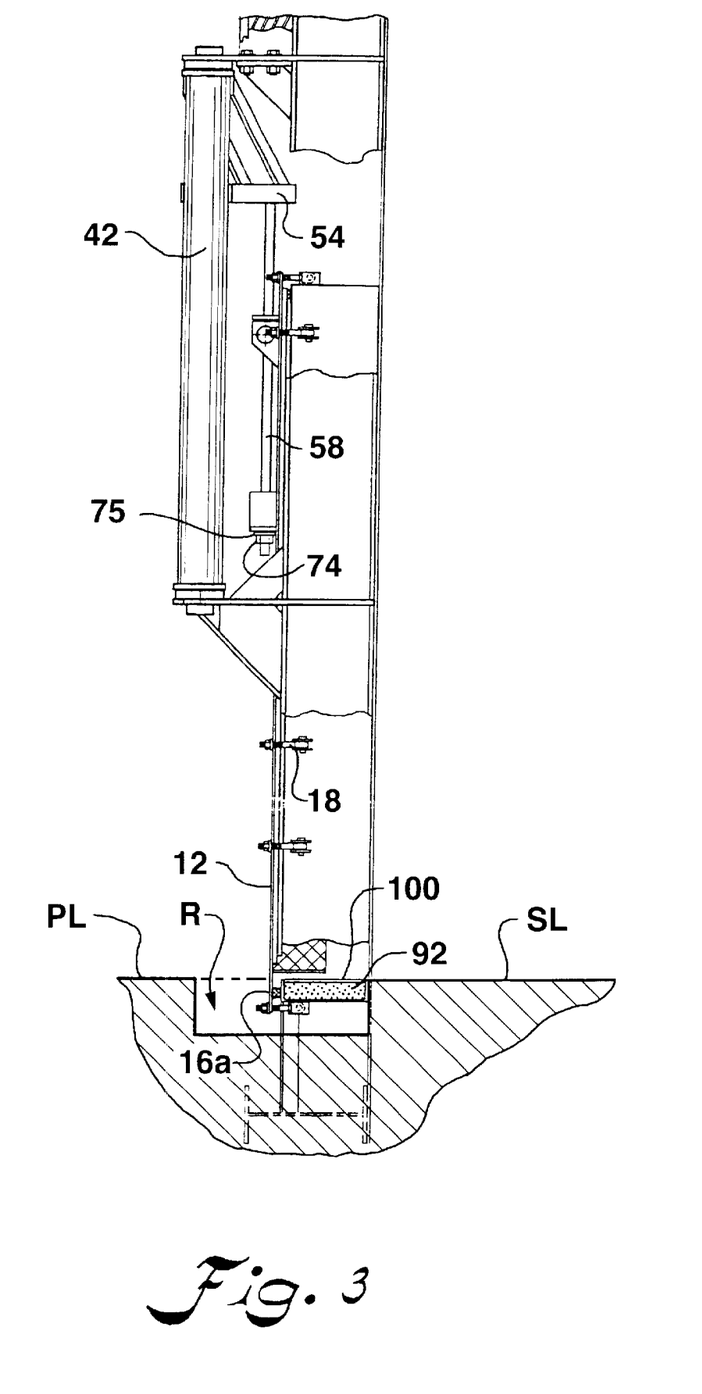
FIG. 3 is a sectional view taken along lines 3—3 of FIG. 2A showing the door in a closed position.
Figure 4:
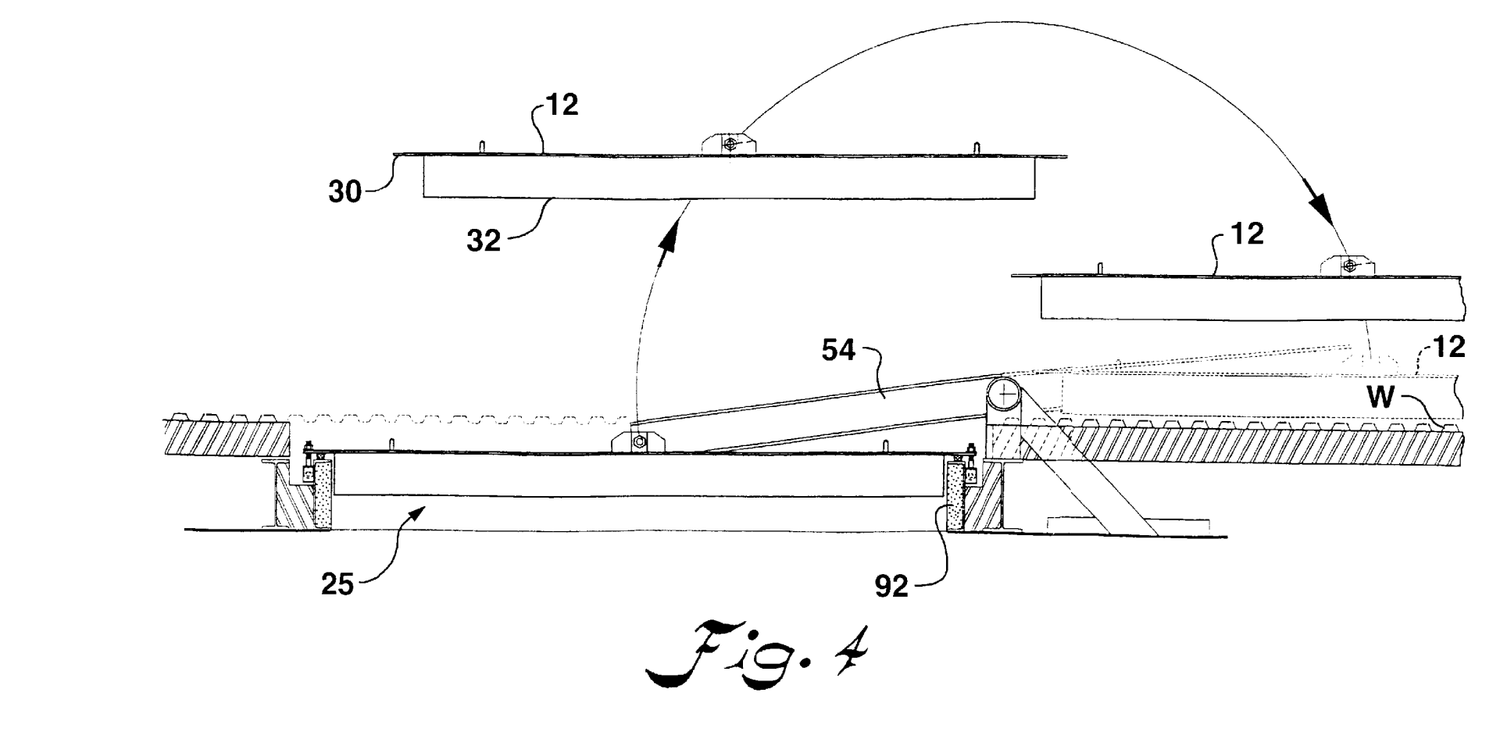
FIG. 4 is a sectional view taken along lines 4—4 of FIG. 2A showing the door in various positions between the open and closed positions.

To open the door to an open position, such as shown in FIGS. 2B and 4, suspension rod nut 74 is first tightened to place suspension rod 58 in tension. Nuts 84 on swing bolts 18 are then loosened. Suspension rod nut 74 would then be further tightened on suspension rod 58, which, because of the engagement of suspension rod nut 74 with the base 86 of yoke 72, would cause a corresponding lifting of door 12. This would raise door 12 upwardly from the position shown in FIG. 5B. Once the door is raised such that the lower edge 16a is above the floor level PL of the platform P, the door 12 may be swung outwardly, such as by grasping handles 28, and by pivoting of the arm 54 of davit assembly 40 to a position over the platform P, such as shown in FIG. 5C. Continued pivoting of davit arm 54 causes a corresponding movement of the door 12 from the closed position, shown in FIGS. 1A, 2A, 3, and 5A, to the open position shown in FIGS. 2B and 4. FIG. 4 illustrates the sequence of movement of the door 12 from the closed to the open position.

To close the door 12, the davit assembly 40 is pivoted in the reverse direction until the door 12 is positioned above the recess R, and the inner plate or panel 32 of the door is adjacent the opening O of door frame 24. The door 12 is then lowered by turning nut 74 in the reverse direction such that inner door panel 32 may be received in opening O. Plate 88 attached adjacent the lower edge 16a of door 12 is tapered and assists in the alignment and closing of door 12. Once door 12 is in place for closure, swing bolts 18 are swung into place within the notches 14 of the door 12, and nuts 84 reattached to the swing bolts 18.

Although not shown, it is to be understood, of course, that instead of rotating nut 74 to raise and lower door 12, the present invention could be modified such that rod 58 is captured by and rotates with respect to yoke 72, and also with respect to nut 62. In such a configuration, rod 58 itself would be turned in order to raise and lower door 12.

Turning to FIGS. 1B and 5A–5C, door frame 24 incldes a channel, generally 90, extending about the periphery of frame 24. After installation, channel 90 is preferably filled with refractory material 92, after installation of the door frame 24, for heat resistance purposes. The lower portion 94 of door frame 24 acts as a threshold and includes sill channel stiffeners 96 which are in place within channel portion 94 prior to pouring of the refractory material. After the refractory material is in place in the lower portion 94, sill plates, generally 98, are then preferably stitch welded to frame 24 to form a sill 100, which in effect becomes an extension of the SCR system floor SF into frame 24, the sill 100 being generally flush with floor SF.

An important feature of the present invention is the installation method of the frame 24 on the SCR structures. The frame includes vertical channel members, generally 102, and horizontal channel members, generally 104, each of which have a generally U-shaped cross section. Inner and outer flanges 106, 108, respectively, are provided about the periphery of frame 24, and the inner flanges 106 are of sufficient height to allow frame 24 to be fitted to a generally rough door opening O in the exterior or casing wall W of the SCR system S. Because of the height dimension of flanges 106, once frame 24 is horizontally centered about door opening O, frame 24 can then be vertically adjusted in order to ensure the upper edge 107 of flange 106 is substantially level with the interior floor SF of the SCR structure. Once the door frame 12 is properly positioned, frame 24 is welded about its periphery to the SCR system structure.

Filler grates (not shown) or other structural members are provided within the platform recess R when the door 12 is open to allow for a generally smooth floor from the platform floor PF, through door opening O, and to the interior floor SF of the SCR structure S when the door 12 is open. There generally level surfaces through door opening O facilitate transport of equipment and supplies, such as containers of catalyst, into and out of SCR structure S.

Another feature of the present invention is the gasket arrangement, generally 110, for the door 12. A ceramic sealing gasket, generally 112, is provided to prevent escape of hot gases from the SCR structure S. Gasket 110 is of a generally square cross section and is preferably made of braided ceramic material. Note vertical portions of gasket 112 on door 12 are represented in the figures by crosshatched portions 112a. Gasket 112 could be of several types, but one suitable gasket is a square braided, ceramic gasket manufactured by Unifrax Corp. of Niagara Falls, N.Y.

Retainers 114 are attached about the periphery of the interior portion of door panel 32, and preferably such retainers 114 are of stainless steel and form a channel 118 having a dovetail-shaped cross section. The dovetail cross section allows for expansion of the gasket 112, once the gasket 112 is compressed by door 12 in a sealing relationship against door frame 24, such as when the door 12 is in the closed position. By capturing such expanded portion of the gasket 112, the retainers 114 reduce the likelihood that gasket 112 will work loose and fall out during repeated opening and closing of the door 12.

One advantage of the present invention is that door system 10 can be installed without regard for left or right hinges for the door. Door system 10 can be installed to open to the left, or installed to open to the right, using identical parts and components with no customization being required.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A door system having a generally vertical door opening of a building, the building having a floor adjacent the door opening, the door system further comprising:

a door panel at least partially covering the door opening of the building, said door panel having a lower portion extending below the level of the floor of the building;

a davit arm connected to the building for pivotal movement with respect to the building; said davit arm being connected to the door panel for allowing said door panel to be moved between a closed position and an open position with respect to the door opening of the building; and a jack connected to said door panel and to said davit arm and allowing said lower portion of said door panel to be selectively lifted from a position below the level of the floor of the building to a position above the level of the floor of the building.

2. The door system as defined in claim 1, further comprising a door frame for attachment adjacent to the door opening of the building, and wherein said door panel bears against said door frame when said door panel is in said closed position.

3. The door system as defined in claim 1, further comprising:

a door frame for attachment adjacent to the door opening of the building; said door frame defining peripheral portions and said peripheral portions including a plurality of fasteners, wherein said fasteners engage and force said door panel against said door frame when said door panel is in said closed position.

4. The door system as defined in claim 1, further comprising:

a door frame for attachment adjacent to the door opening of the building;

said door frame defining peripheral portions and said peripheral portions including a plurality of fasteners; and said door panel defining a plurality of slots for receipt of said fasteners, wherein said fasteners engage and force said door panel against said door frame when said door panel is in said closed position.

5. The door system as defined in claim 1, further comprising:

a door frame for attachment adjacent to the door opening of the building;

said door frame defining peripheral portions and said peripheral portions including a plurality of pivoting bolts; and said door panel defining a plurality of slots for receipt of said pivoting bolts, wherein said pivoting bolts engage and force said door panel against said door frame when said door panel is in said closed position.

6. The door system as defined in claim 1, wherein said jack includes:

a rod, one end of which is fixedly attached to said davit arm, and the other end of which being threaded;

a bracket attached to said door panel, said bracket defining a bore for receipt of said threaded end of said rod; and a nut threadingly attached to said threaded end of said rod, such that upon selective rotation of said nut, said nut bears against said bracket and forces said bracket and said door panel upwardly.

7. A door system as defined in claim 1, further comprising:

a gasket for sealing said door panel when said door panel is in said closed position; and an elongated channel member connected to said door panel for receipt of said gasket, said channel member having a generally dovetail-shaped cross section for allowing expansion of said gasket upon sealing of said door panel when said door panel is in said closed position.

8. A door system as defined in claim 1, further comprising:

a gasket for sealing said door panel when said door panel is in said closed position, said gasket being generally square in cross sectional shape; and an elongated channel member connected to said door panel for receipt of said gasket, said channel member having a generally dovetail-shaped cross section for allowing expansion of said gasket upon sealing of said door panel when said door panel is in said closed position.

9. A door system having a generally vertical door opening of a selective catalytic reactor structure, the structure having an interior floor surface and an exterior floor surface adjacent the door opening, the door system further comprising:

a door panel at least partially covering the door opening of the structure, said door panel having a lower portion adapted for extending below the level of the interior floor surface;

a davit arm connected to the structure for pivotal movement with respect to the structure; said davit arm being connected to the door panel for allowing said door panel to be moved between a closed position and an open position with respect to the door opening of the structure; and a screw jack connected to said door panel and to said davit arm, such that upon selective actuation of said screw jack, said lower portion of said door panel is lifted from a position below the level of the interior floor of the structure to a position above the level of the exterior floor of the structure.

10. A method of installing a door for a generally vertical door opening in the exterior wall of a selective catalytic structure, the structure having an interior floor surface adjacent the door opening, the method comprising:

providing a door frame defining a doorway opening having a lower threshold portion;

providing a door panel for receipt in said doorway;

positioning said door frame such that said lower threshold portion is at substantially the same elevation as the interior floor surface;

positioning said door panel such that a lower edge thereof extends below the elevation of the interior floor surface and such that said doorway is in general alignment with the door opening of the structure;

attaching said doorway to the structure; and attaching said door panel to said door frame for movement between an open position, wherein said doorway is generally unobstructed, to a closed position, wherein said doorway is generally covered by said door panel.

11. The method as defined in claim 10, wherein said attaching of said door panel to said door frame includes:

providing a davit assembly;

attaching said davit assembly to the structure; and connecting said davit assembly to said door panel.

12. The method as defined in claim 10, wherein said attaching of said door panel to said door frame includes:

providing a davit assembly;

attaching said davit assembly to the structure;

connecting said davit assembly to said door panel;

providing a jack mechanism; and attaching said jack mechanism to said door panel for allowing the selective lifting and lowering of said door panel.

13. The method as defined in claim 10, further comprising:

providing an exterior floor surface adjacent the door opening; and providing a recess in said exterior floor surface for receipt of said lower edge of said door panel when said door panel is in said closed position.

14. A method of operating a door for a generally vertical door opening of a selective catalytic structure, the structure having an interior floor surface and an exterior floor surface adjacent the door opening, the exterior floor surface having a recess extending below the door opening and the level of the interior floor surface, the method comprising:

providing a door panel for at least partially covering the door opening of the structure, said door panel having a lower portion extending below the level of the interior floor surface;

providing a davit arm connected to the structure for pivotal movement with respect to the structure;

providing a jack connected to said door panel and to said davit arm;

actuating said jack such that said lower portion of said door panel is lifted from a position below the level of the floor of the structure to a position above the level of the exterior floor; and pivoting said door panel about the davit assembly such that said door panel no longer covers the door opening.

15. The method as defined in claim 14, further comprising:

after said pivoting of said door panel such that said door panel no longer covers the door opening, pivoting said door panel such that said door panel is positioned above the recess in the exterior floor and adjacent the door opening;

actuating said jack such that said lower portion of said door panel is lowered from a position above the level of the exterior floor of the structure to a position below the level of the interior floor; and moving said door panel such that said door panel at least partially covers the door opening of the structure.

* * * * *